United States Patent [19]

Gartside, III et al.

[11] Patent Number: 5,082,348
[45] Date of Patent: Jan. 21, 1992

[54] OPTICAL FIBER CABLE

[75] Inventors: Charles H. Gartside, III; Andrew J. Panuska, both of Lilburn; Parbhubhai D. Patel, Dunwoody, all of Ga.

[73] Assignee: AT&T Bell Laboratories, Murray Hill, N.J.

[21] Appl. No.: 556,929

[22] Filed: Jul. 20, 1990

Related U.S. Application Data

[63] Continuation of Ser. No. 311,306, Feb. 16, 1989, Pat. No. 4,971,419, which is a continuation of Ser. No. 180,652, Mar. 25, 1988, Pat. No. 4,826,278, which is a continuation of Ser. No. 721,533, Apr. 10, 1985, abandoned.

[51] Int. Cl.$^5$ .............................................. G02B 6/44
[52] U.S. Cl. ..................................... 385/111; 385/113
[58] Field of Search ........................................ 57/6-9, 57/13-18; 264/1.5; 350/96.23, 96.34

[56] References Cited

U.S. PATENT DOCUMENTS

| | | | |
|---|---|---|---|
| 1,987,442 | 1/1935 | Harris | 174/27 |
| 4,172,106 | 10/1979 | Lewis | 264/1 |
| 4,342,500 | 8/1982 | Oestreich et al. | 350/96.23 |
| 4,370,023 | 1/1983 | Lange et al. | 350/96.23 |
| 4,446,686 | 5/1984 | Panuska et al. | 57/6 |
| 4,464,013 | 8/1984 | Sabia | 350/96.23 |
| 4,509,821 | 4/1985 | Stenger | 350/96.23 |
| 4,557,560 | 12/1985 | Bohannon, Jr. et al. | 350/96.23 |
| 4,826,278 | 6/1989 | Gartside, III et al. | 350/96.23 |
| 4,971,419 | 11/1990 | Gartside et al. | 350/96.23 |

FOREIGN PATENT DOCUMENTS

| | | |
|---|---|---|
| 0067009 | 12/1982 | European Pat. Off. . |
| 0074714 | 3/1983 | European Pat. Off. . |
| 2551210 | 5/1977 | Fed. Rep. of Germany ... 350/96.23 |
| 58-14804 | 1/1983 | Japan . |
| 58-27104 | 2/1983 | Japan . |
| 1438074 | 6/1976 | United Kingdom . |
| 2106266 | 4/1983 | United Kingdom . |

OTHER PUBLICATIONS

*Wireless World* Article, vol. 82, No. 1488, Aug. 1976.

*Primary Examiner*—John D. Lee
*Attorney, Agent, or Firm*—Edward Somers

[57] ABSTRACT

An optical fiber cable (20) includes a core (21) comprising a plurality of optical fibers (24—24) without intended stranding. The plurality of optical fibers are enclosed in a common tube (34) which provides a predetermined packing density and which is substantially parallel to the longitudinal axis of the cable. In one embodiment, a waterblocking material (36) is disposed within the tube to fill the interstices between the optical fibers and between the fibers and the tube. The waterblocking material is such that its critical yield stress does not exceed about 70 Pa at 20° C. and such that it has a shear modulus of less than about 13 KPa at 20° C. The common tube is enclosed with non-metallic or metallic strength members and a plastic inner jacket and by another layer of strength members and by a plastic outer jacket. This arrangement is such that the cable may be manufactured and installed with optical fibers capable of moving within the cable structure to prevent undue stresses being imparted thereto which would cause unwanted microbending losses.

3 Claims, 5 Drawing Sheets

Fig_7

Fig_4

Fig_5

OPTICAL FIBER CABLE

This is a continuation of application Ser. No. 07/311,306 (U.S. Pat. No. 4,971,419), filed on Feb. 16, 1989 by C. H. Gartside, III, A. J. Panuska & P. D. Patel which is a continuation of application Ser. No. 07/180,652 (U.S. Pat. No. 4,826,278) filed 03/25/88 which is a continuation of application Ser. No. 06/721,533 filed 4/10/85 for Optical Fiber Cable and Methods of Making.

TECHNICAL FIELD

This invention relates to an optical fiber cable. More particularly, this invention relates to an optical fiber cable which includes a plurality of multifiber units which are disposed within a single tube that is provided with additional elements of a sheath arrangement.

BACKGROUND OF THE INVENTION

Developments in the optical fiber communications field have been rapid. However, the technology still is undergoing major shifts in direction. For example, earlier generation fiber systems were designed to operate at wavelengths of about 0.8 $\mu$m; and current systems operate at 1.3 $\mu$m. Now there is growing interest in systems having an operating wavelength of about 1.55 $\mu$m to take advantage of the loss window that exists in silica-based optical fiber in that wavelength region. Another example of a major shift which is driven by demand for higher bandwidths is that from multimade to single mode fibers.

Although desired for their large bandwidth capabilities and small size, light-transmitting optical fibers are mechanically fragile, exhibiting low-strain fracture under tensile loading and degraded light transmission when bent. The degradation in transmission which results from bending is known as microbending loss. As a result, cable structures have been developed to protect mechanically the optical fibers.

A cable for use in a duct must be capable of withstanding tensile louds applied when the cable is pulled into the duct and stresses caused by bends. Cable structures which have been developed for optical fibers include loose tube, stranded and ribbon cables. For a description of loose tube cables, see, for example, D. Lawrence and P. Bark "Recent Developments in Mini-Unit Cable" published at pp. 301–307 of the Proceedings of the 32nd International Wire and Cable Symposium, 1983. See also U.S. Pat. No. 4,153,332.

Ribbon cable comprises one or more ribbons with each including a plurality of optical fibers disposed generally in a planar array. In U.S. Pat. No. 4,078,853 which issued to R. Kempf et al on Mar. 14, 1978 is shown a cable which includes a core of ribbons surrounded by a loose-fitting plastic inner tubular jacket. A plastic outer jacket is reinforced with strength members which are encapsulated in the outer jacket to achieve tight coupling therewith.

In some situations, especially duct systems which include many bends such as those in loop plant in urban areas, greater tensile loads are expected. An improved optical communications cable which is suitable for such use is disclosed in U.S. Pat. No. 4,241,979 which issued on Dec. 30, 1980 in the names of P. F. Gagen and M. R. Santana. A bedding layer, about which strength members are wrapped helically, is added between plastic extruded inner and outer jackets to control the extent to which the strength members are encapsulated by the outer jacket. The cable includes two separate layers of strength members, which are wrapped helically in opposite directions. Under a sustained tensile load, these two layers of strength members produce equal but oppositely directed torques about the cable to insure the absence of twisting.

Ribbon cable has a number of attractive features. One is the relative ease of array connectorization. Array connectors shown, for example, in U.S. Pat. No. 3,864,018 can be factory installed and can save much time over that required for single fiber joining techniques. A further advantage is that a higher fiber density can be achieved per unit of cable cross-section than in a stranded cable.

In another type of optical communications cable, a plurality of optical fibers are enclosed in an extruded plastic tube to form a unit and a plurality of these tubed units are enclosed in a common extruded plastic tube which is enclosed in a sheath system. Generally, the optical fibers which are enclosed in each unit tube are stranded together about a central strength member. A central strength member is used because it is relatively easy to assemble into the cable. Also, the cable is more easily bent if it has a central strength member rather than strength members which are incorporated into the sheath system. However, when such a cable is bent, the central strength member may in some instances compress one or more of the fibers against the tube and cause damage thereto.

Generally, optical fiber cables of the prior art, such as ribbon and stranded and loose tube, suffer from the disadvantage of having the ribbons, the stranded units or the tubes manufactured on a separate line. In stranded cable, for example, a plurality of units which priorly have been enclosed individually in tubes and stranded are fed into a line which applies the common tube and the outer jacket. Each of the units must be made separately on another line and inventoried until a plurality of them can be associated together in the common tube. Because the ribbon or tubed core is generally stranded with a predetermined lay, its manufacture and the assembly of the ribbons or tubes into the core involves the use of relatively heavy rotating apparatus which is undesirable from a manufacturing standpoint.

Further complicating of the cable situation is the introduction of a waterblocking filling material into the cable core in order to prevent the incursion of water. A viscoelastic waterblocking material which has been used in the past is disclosed in U.S. Pat. No. 4,176,240 issued on Nov. 27, 1979, in the name of R. Sabia. Typically, the waterblocking materials in use do not yield under strains experienced when the cable is made or handled. This prevents the movement of the optical fibers within the cable and the fibers buckle because they contact, with a relative small periodicity, a surface of the unyielding filling material. The smaller the periodicity of the fibers in contacting such an unyielding surface, the greater the microbending loss. This is overcome somewhat by stranding the cable which allows the fibers under stress to form new helices to avoid microbending losses. A grease-like filling composition having a relatively low critical yield stress is disclosed in application Ser. No. 697,054 filed on Jan. 31, 1985, in the names of C. H. Gartside III et al (now U.S. Pat. No. 4,701,016).

Clearly, what is needed is a cable for optical fiber transmission which departs from those used in the past.

That cable should be one which can be made inexpensively relative to present costs and which is relatively compact. Also, the cable structure should be one which inhibits the introduction of undue stresses which would lead to microbending losses in the optical fibers. It is believed that the prior art does not include such a cable for which there is a long felt need in order to provide low cost optical fiber communications.

SUMMARY OF THE INVENTION

The foregoing problems have been overcome by a cable of this invention. An optical fiber cable of this invention includes a plurality of optical fibers which extend without intended stranding in a direction parallel to a longitudinal axis of the cable. Each of the optical fibers includes an optical glass transmission medium and at least one coating layer which encloses the glass transmission medium. A length of tubing which is made of a plastic material encloses the plurality of optical fibers and is parallel to the longitudinal axis of the cable. The ratio of the cross-sectional area of the plurality of optical fibers to the cross-sectional area within the tubing does not exceed a predetermined value which in a preferred embodiment in which the optical fibers are coated is about 0.5. The cable also includes at least one strength member and a jacket which is made of a plastic material and which encloses the length of tubing. The optical fibers are able to become repositioned in the tubing as the cable is handled to prevent undesirable added losses and each of the optical fibers has a length which exceeds the length of the tubing. In one embodiment, a waterblocking material which is disposed within the tubing and which fills substantially the interstices between the fibers has a critical yield stress which is not greater than about 70 Pa at 20° C. and a shear modulus which is less than about 13 Kpa at about 20° C. Each unit is separated from another unit only by the waterblocking material and the plurality of units are enclosed in a common length of tubing instead of individual tubes as in the prior art. The waterblocking material is such that it behaves as an elastic solid up to a critical stress value, and is characterized as a liquid above that value.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figures 1, 3:
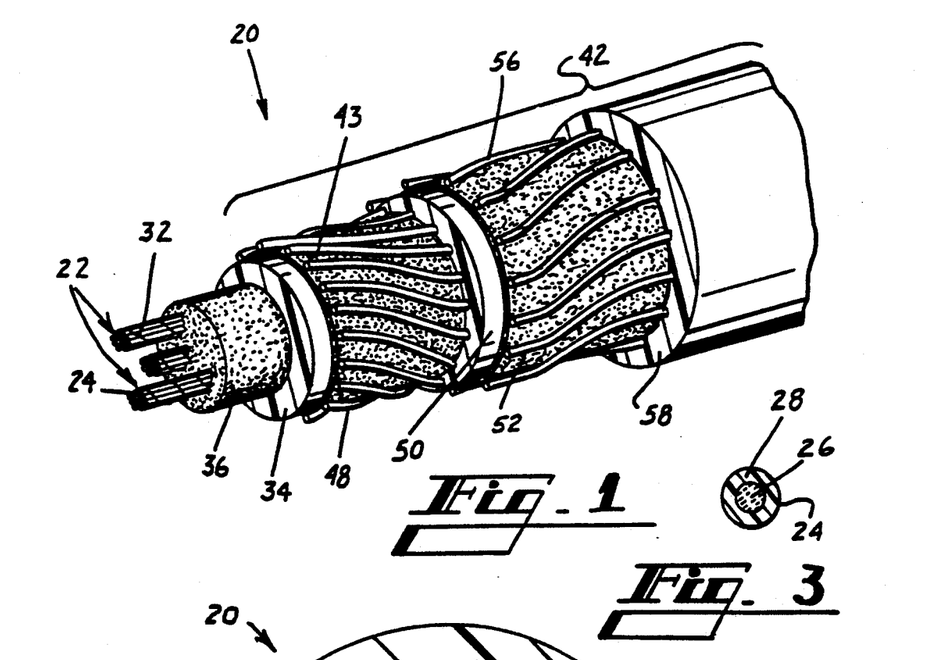
FIG. 1 is a perspective view of an optical fiber cable.
FIG. 3 is an end view of a coated optical fiber.
Figure 2:
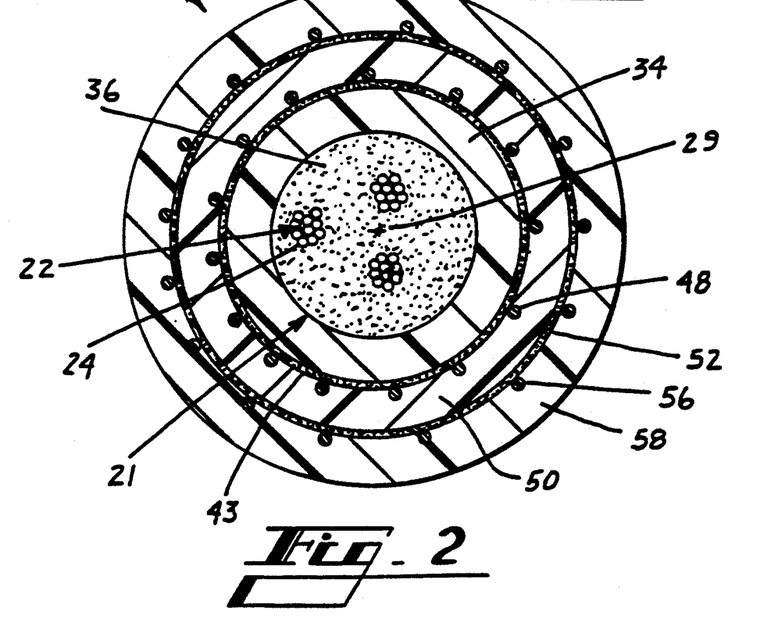
FIG. 2 is an end view of the optical fiber cable of FIG. 1.

Referring now to FIGS. 1 and 2, there is shown a cable 20. It includes a core 21 comprising a plurality of optical fibers 24—24 which may be arranged in at least one unit 22. Further, each of the optical fibers 24—24 includes a fiber 26 and one or more coatings 28—28 (see FIG. 3). It should be understood that herein the term optical fiber refers to the fiber itself and any coating applied thereto. Each of the units 22—22 either is stranded or non-stranded, that is the unit extends generally parallel to a longitudinal axis 29 of the cable, or is formed with an oscillating lay.

It should be understood that the optical fibers 24—24 which are included in each of the units 22—22 of the preferred embodiment are assembled without being stranded together and furthermore that the unit itself is assembled with an infinite lay length. The optical fibers may be undulated along portions of the unit which will cause each of the optical fibers to have a length which is at least slightly greater than the length of any enclosing sheath system. This will prevent undue strain from being imparted to the optical fibers 24—24 during manufacture, installation and service of the cable.

As is further seen in FIGS. 1 and 2, each unit is individually bound by a binder 32 and is enclosed in a tube 34. The tube 34 which is made of a plastic material such as polyvinyl chloride or polyethylene, for example, contains the individually untubed, bound units and extends generally parallel to the longitudinal axis 29 of the cable 20.

An important characteristic of the cable of this invention is its packing density. Packing density is defined as the ratio between the cross-sectional area of the optical fibers and any coatings thereon to the total cross-sectional area enclosed by the tube 34. If the packing density is too high, optical fibers within the core may experience relatively high stress and could break during handling of the cable. This occurs when the packing density is too high, because as with the use of waterblocking materials which yield at a relatively high stress, the optical fiber cannot move sufficiently within the tube to relieve stresses such as would occur in bending. In the prior art, this problem was overcome by stranding the individual tubes which enclose the units. However, as is well-known, stranding requires a lower line speed and results in increased costs.

In FIGS. 1 and 2, the at least one unit and the core between the at least one unit and the tube 34 may be filled with a suitable waterblocking material 36. It has been determined that in an optical fiber cable, a filling composition must also function to maintain the optical fibers in a relatively low state of stress. Such a material is a colloidal particle-filled grease composition disclosed in priorly disclosed application Ser. No. 697,054 which was filed Jan. 31, 1985, (U.S. Pat. No. 4,701,016) and which is incorporated by reference hereinto.

A grease typically is a solid or semiliquid substance comprising a thickening or gelling agent in a liquid carrier. The gelling agents used in greases frequently are fatty acid soaps, but high melting point materials, such as clays, silicas, organic dyes, aromatic amides, and urea derivatives also may be used.

When a low stress is applied to a grease, the material acts substantially as a solid-like material. If the stress is above a critical value, then the viscosity decreases rapidly and the material flows. The decrease in viscosity is largely reversible because typically it is caused by the rupture of network junctions between filler particles, and these junctions can reform following the removal of the supercritical stress.

A cable filling or waterproofing material, especially an optical fiber cable filling compound, should meet a variety of requirements. Among them is the requirement that the physical properties of the cable remain within acceptable limits over a rather wide temperature range, e.g. from about −40° to about 76° C. It is also desirable that the filling material be relatively free of syneresis over the aforementioned temperature range. Syneresis is the separation of oil from the gel under applied stress. Filling materials for use in optical fiber cables also should have a relatively low shear modulus. According to the prior art, the shear modulus is a critical material parameter of optical fiber cable filling materials because it is believed to be directly related to the amount of microbending loss. For a discussion of microbending loss, see S. E. Miller et al., *Optical Fiber Telecommunications*, Academic Press, New York (1979), pp. 158-161. Typically, microbending loss is more difficult to control at long wavelengths than at short ones. Thus, it is important to be able to produce optical fiber cable that has no significant cabling-induced losses at long wavelengths such as, for example, 1.55 $\mu$m.

The preferred waterblocking material is a composition which comprises two major constituents, namely oil, and a gelling agent such as colloidal particles, and, optionally, a bleed inhibitor as a third major component. Other constituents such as a thermal oxidative stabilizer, for example, are optional.

Among the oils useful in the waterblocking material are polybutene oils having a minimum specific gravity of about 0.83 and a maximum pour point, as per ASTM D97, of less than about 18° C., or ASTM type 103, 104A, or 104B, or mixtures thereof, per ASTM D-226 test, of naphthenic or paraffinic oils having a minimum specific gravity of about 0.86, and a maximum pour point, per ASTM D97, of less than about −4° C. Specific examples of oils useful in the cable of the invention are a polybutene oil, which is a synthetic hydrocarbon oil having a pour point per ASTM D97 of −35° C., an SUS viscosity of 1005 at 99° C., a specific gravity of 0.8509, and an average molecular weight of 460. It is available from the Amoco Chemical Corporation, Texas City, Tex., under the trade designation L-100. Another example oil is a white mineral oil, having a pour point per ASTM D97 of −25° C., an SUS viscosity of 53.7 at 99° C., an average specific gravity of 0.884, and maximum aromatic oils 1% by weight (b.w.). The latter is available from Penreco of Butler, Pa., under the designation Drakeol 35. Other oils include triglyceride-based vegetable oils such as castor oil and other synthetic hydrocarbon oils such as polypropylene oils. For applications requiring fire-retardant properties, chlorinated paraffin oils having a chlorine content of about 30-75% b.w. and a viscosity at 25° C. of between 100 and 10,000 cps are useful. An example of such oil is Paroil 152, which is available from the Dover Chemical Company of Dover, Ohio. Polymerized esters of acrylic acid or similar materials are useful as pour-point depressants at addition levels below 5% b.w. An example is ECA 7955, available from the Exxon Chemical Company.

Colloidal filler particles in oil gel the oil by bonding surface hydroxyl groups to form a network. Such gels are capable of supporting a load below a critical value of stress. Above this stress level, the network is disrupted, and the material assumes a liquid-like character and flows under stress. Such behavior is often referred to as thixotropic.

Colloidal fillers useful in the cable of the invention include colloidal silica, either hydrophilic or hydrophobic, preferably a hydrophobic fumed silica having a BET surface area between about 50 and about 400 m$^2$/gm. An example of a hydrophobic fumed silica is a polydimethylsiloxane-coated fumed silica having a BET surface area of about 80-120 m$^2$/gm, containing about 5% b.w. carbon, and being available from the Cabot Corporation of Tuscola, Ill. under the trade designation Cab-O-Sil N70-TS. An exemplary hydrophilic colloidal material is fumed silica with a BET surface area of about 175-225 m$^2$/gm, nominal particle size of 0.012 $\mu$m, and a specific gravity of 2.2, available from the Cabot Corporation under the designation Cab-O-Sil M-5. Other colloidal fillers useful in the practice of the invention are precipitated silicas and clays such as bentonites, with or without surface treatment.

Oil-retention of the inventive greases may be improved by the addition of one or more bleed inhibitors to the composition. The bleed inhibitor can be a rubber block copolymer, a relatively high viscosity semiliquid, sometimes referred to as semisolid, rubber, or other appropriate rubber. Block copolymers and semiliquid rubbers will be referred to collectively as rubber polymers. Incorporating a rubber polymer into the grease composition allows a reduction in the amount of colloidal particles that must be added to the mixture to prevent syneresis of the gel. This reduction can result in cost savings. Furthermore, it makes possible the formulation of nonbleeding compositions having a relatively low critical yield stress.

Among the rubber block copolymers that can be used in waterblocking compositions for the cable of the invention are styrene-rubber and styrene-rubber-styrene block copolymers having a styrene/rubber ratio between approximately 0.1 and 0.8 and a molecular weight, as indicated by viscosity in toluene at 25° C., of from about 100 cps in a 20% b.w. rubber solution. Exemplary block rubbers are a) a styrene-ethylene propylene block copolymer (SEP), unplasticized, having a styrene/rubber ratio of about 0.59, a specific gravity of about 0.93, a break strength per ASTM D-412 of 300 psi, and being available from the Shell Chemical Company of Houston, Tex., under the trade designation Kraton G1701; b) styrene-ethylene butylene block copolymer (SEB), having a styrene/rubber ratio about 0.41, and being available from the Shell Chemical Company under the designation TRW-7-1511; c) styrene-ethylene butylene-styrene block copolymer (SEBS), unplasticized, and having a styrene/rubber ratio of about 0.16, a specific gravity of about 0.90, 750% elongation, 300% modulus per ASTM D-412 of 350 psi, and being available from the Shell Chemical Corporation under the trade designation Kraton G1657. Other styrene-rubber or styrene-rubber-styrene block copolymers are styrene-isoprene rubber (SI) and styrene-isoprene-styrene (SIS) rubber, styrene-butadiene (SB) and styrene-butadiene-styrene (SBS) rubber. An example of SIS is Kraton D1107, and an example of SBS is Kraton D1102, both available from the Shell Chemical Company.

Among the semiliquid rubbers found useful in the practice of the invention are high viscosity polyisobutylenes having a Flory molecular weight between about 20,000 and 70,000. Exemplary thereof is a polyisobutylene having a Flory molecular weight of about 42,600–46,100, a specific gravity of about 0.91, and a Brookfield viscosity at 350° F. (about 177° C.) of about 26,000–35,000 cps, and available from the Exxon Chemical Company of Houston, Tex. under the trade designation Vistanex LM-MS. Other rubbers which are considered to be useful are butyl rubber, ethylene-propylene rubber (EPR), ethylene-propylene dimer rubber (EPDM), and chlorinated butyl rubber having a Mooney viscosity ML 1+8 at 100° C. per ASTM D-1646 of between about 20 and 90. Examples of the above are Butyl 077, Vistalon 404, Vistalon 3708, and Chlorobutyl 1066, respectively, all available from the Exxon Chemical Company. Also useful are depolymerized rubbers having a viscosity of between about 40,000 and 400,000 cps at 38° C. An example thereof is DPR 75 available from Hardman, Inc. of Belleville, N.J.

Oil-retention has been tested by using a procedure that substantially corresponds to the Rural Electrification Authority (REA) PE-89 oil-retention test. If any measured amount of dripped oil is present from this test, the grease composition is considered to have failed the oil-retention test. Another test comprises centrifuging a 30 gm sample of a composition for 60 minutes at 10,000 rpm, and decanting and weighing any separated oil at the end of the test period. It has been determined that in order for the composition to have desirable oil retention up to about 60° C. or about 80° C., it should exhibit at room temperature oil separation not greater than about 7% and about 2.5%, respectively, as determined by the above centrifuge test.

The composition of the waterblocking material 36 is intended to block effectively entry of water into the core 21 while minimizing the added loss to the cable in order to provide excellent optical performance. Although the oil retention characteristic of the composition is a concern, the most important property is the optical performance of the cable 20.

Table I shows the effect of several different bleed inhibitors on oil separation, for two different oils, Drakeol 35 and L-100. The three block copolymer-containing compositions comprise 92% b.w. oil, 6% b.w. Cab-O-Sil N70-TS colloidal filler, and 2% b.w. inhibitor. The semiliquid rubber-containing compositions LM-MS comprise 6% b.w. N70-TS colloidal filler, the indicated amounts of the inhibitor, and 89 and 84% b.w. of Drakeol 35.

TABLE I

| Inhibitor | Oil Separation Drakeol-35 % Separation | L-100 % Separation |
|---|---|---|
| 2% SEP | 2.5 | 0.7 |
| 2% SEB | 11 | 3.5 |
| 2% SEBS | 5 | 2 |
| 5% LM-MS | 7 | — |
| 10% LM-MS | 2 | — |

Table II shows data on oil separation for several compositions that do not include bleed inhibitors. It should be evident that the addition of a bleed inhibitor is more effective than increasing the colloidal particle content of the composition in preventing oil separation or drip. Also, increasing the colloidal particle-content of a grease to the point where syneresis is avoided results in increased critical yield stress. Thus to avoid syneresis altogether, the low values of critical yield stresses needed in some instances may be unobtainable without use of bleed inhibitors. The data of Table II was obtained with N70-TS colloidal filler and Drakeol 35 oil.

TABLE II

| Oil Separation | | | | |
|---|---|---|---|---|
| fumed silica (% b.w.) | 6 | 7 | 8 | 10 |
| oil separation (% b.w.) | 36 | 28 | 20 | 14 |

Figure 4:
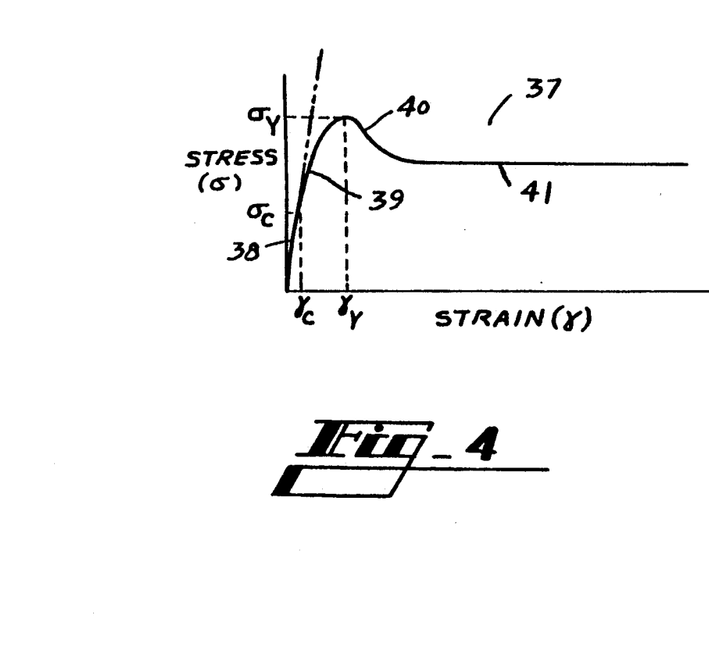
FIG. 4 shows an exemplary curve of applied stress versus strain for a waterblocking material for the cable of FIG. 1.

FIG. 4 shows a generalized stress-strain curve 37 at constant strain rate for a thixotropic material such as that used as the waterblocking material 36, and identifies several important parameters. In segment 38 of the stress-strain curve 37, the material acts essentially as an elastic solid. The segment extends from zero stress to the critical yield stress $\sigma_c$. The strain corresponding to $\sigma_c$ is identified as $\gamma_c$, the critical shear strain. By definition, the coordinates $\sigma_c, \gamma_c$ indicate the onset of yielding and the quantity $\sigma_c/\gamma_c$ (or $d\sigma/d\gamma$ for $\sigma < \sigma_c$) is known as the shear modulus ($G_e$) of the material.

The prior art teaches that filling materials for optical fiber cable need to have low values of $G_e$. However, it has been determined that, at least for some applications, a low value of $G_e$ of the filling material is not sufficient to assure low cabling loss, and that a further parameter, the critical yield stress, $\sigma_c$, also needs to be controlled. Typically, the critical yield stress of material according to the invention is not greater than about 70 Pa, measured at 20° C. whereas the shear modulus is less than about 13 kPa at 20° C.

A segment 39 of the stress-strain curve of FIG. 4 represents increasing values of incremental strain for increasing stress. The stress $\sigma_y$ is the maximum value of stress sustainable by the material at a given strain rate with $\gamma_y$ being the corresponding strain. For strains in excess of $\gamma_y$, the stress at first decreases as shown by segment 40, becoming substantially independent of strain for still greater values of strain as shown by the segment 41. The waterblocking material thus exhibits a liquid like behavior for $\gamma > \gamma_y$.

A filling composition for a filled cable 20 typically comprises between about 77 and about 95% b.w. oil. If a bleed inhibitor is present and the inhibitor is a rubber block copolymer, then the oil content typically is between about 90 and about 95% b.w. On the other hand, if the bleed inhibitor is a semiliquid rubber, then the oil content typically is between about 77 and about 91% b.w. The composition further comprises at most 15% b.w., preferably at most 10% b.w., of colloidal particles. If the colloidal particles are fumed silica, then a typical range is from 2 to about 10% b.w., with 5-8% b.w. being currently preferred for some applications. The bleed inhibitor content of the composition is typically between about 0.5 and 15%, with the currently preferred range for block copolymer rubbers being between about 0.5 and about 5% b.w., and for semiliquid rubbers being between about 3 and about 15% b.w. Optionally, the composition may also comprise minor amounts of an oxidative stabilizer and other additives. An exemplary stabilizer is tetrakis methane, available from Ciba-Geigy under the trade designation Irganox 1010. Typically the oil, colloidal particles, and, if used, a bleed inhibitor, account for about 99% b.w. or more of the total composition.

Exemplary compositions that were studied are shown in Table III in parts by weight. The compositions were prepared by known methods, typically comprising blending oil, bleed inhibitor, antioxidant, and colloidal particle material first at ambient temperature and pressure, then at ambient temperature under a partial vacuum (typically less than about 300 Torr). Some compositions, e.g. E, were heated to about 150° C. while being stirred, and maintained at that temperature for about 4 hours. The resulting compositions were evaluated, including a determination of $\sigma_c$ and $G_e$ of some by cone-and-plate rheometry. An exemplary summary of the properties also is presented in Table III with all measurements of $\sigma_c$ and $G_e$ being at 20° C.

Of the example compositions disclosed in Table III, example A is preferred. The stress values designated (a) were determined without aging while those designated (b) were aged for the time indicated. Notwithstanding the use of bleed inhibitors in many of the examples of Table III, some do not pass the drip test. However, cables filled with any of the compositions of Table III meet the requirements for optical performance.

The mechanical properties of the inventive composition are a function of the colloidal particle content. For example, it has been determined that $\sigma_c$ as well as $G_e$ decreases with decreasing particulate content.

jackets are made of polyethylene although other plastic materials may be used. Further, the materials for the jackets may differ. The strength members are steel wires in the preferred embodiment. However, it is apparent that other materials, metallic and non-metallic, may be used for those members.

Figure 5:
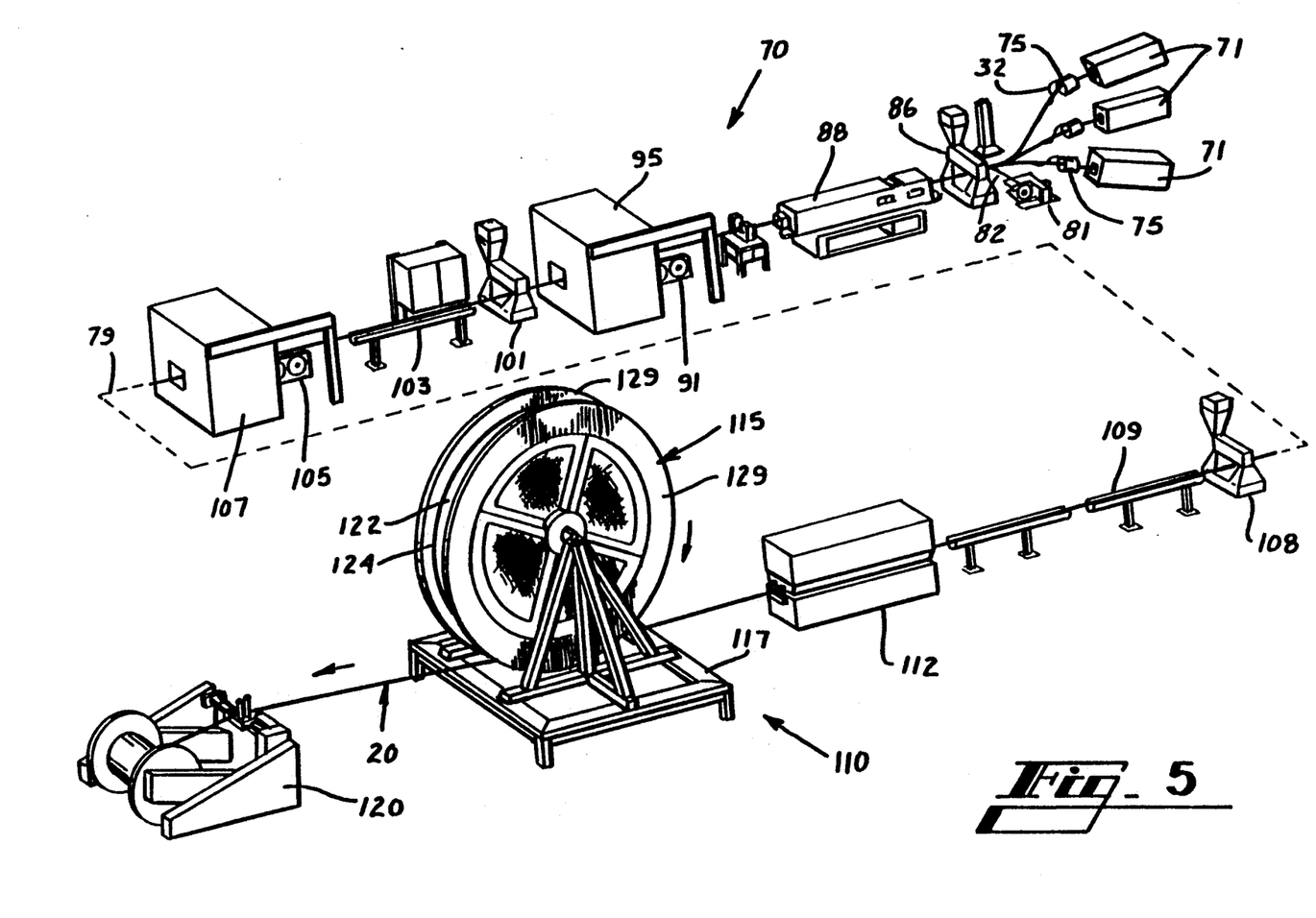
FIG. 5 is a schematic view of a manufacturing line which is used to manufacture the cable of FIG. 1.

Referring now to FIG. 5 of the drawings, there is shown an apparatus which is designated generally by the numeral 70 and which may be used to manufacture cable of this invention. In the apparatus 70, a payout 71 (see FIGS. 5 and 6) is provided for supplying a plurality of the coated optical fibers 24—24 for each unit 22. Each of the fibers 24—24 is payed out from a spool 73 which is mounted on a support platform 76. The supply spools 73—73 are mounted rotatably on either side of or along an axis 79 of the manufacturing line and are braked to apply a desired back tension to the fibers.

Figure 6:
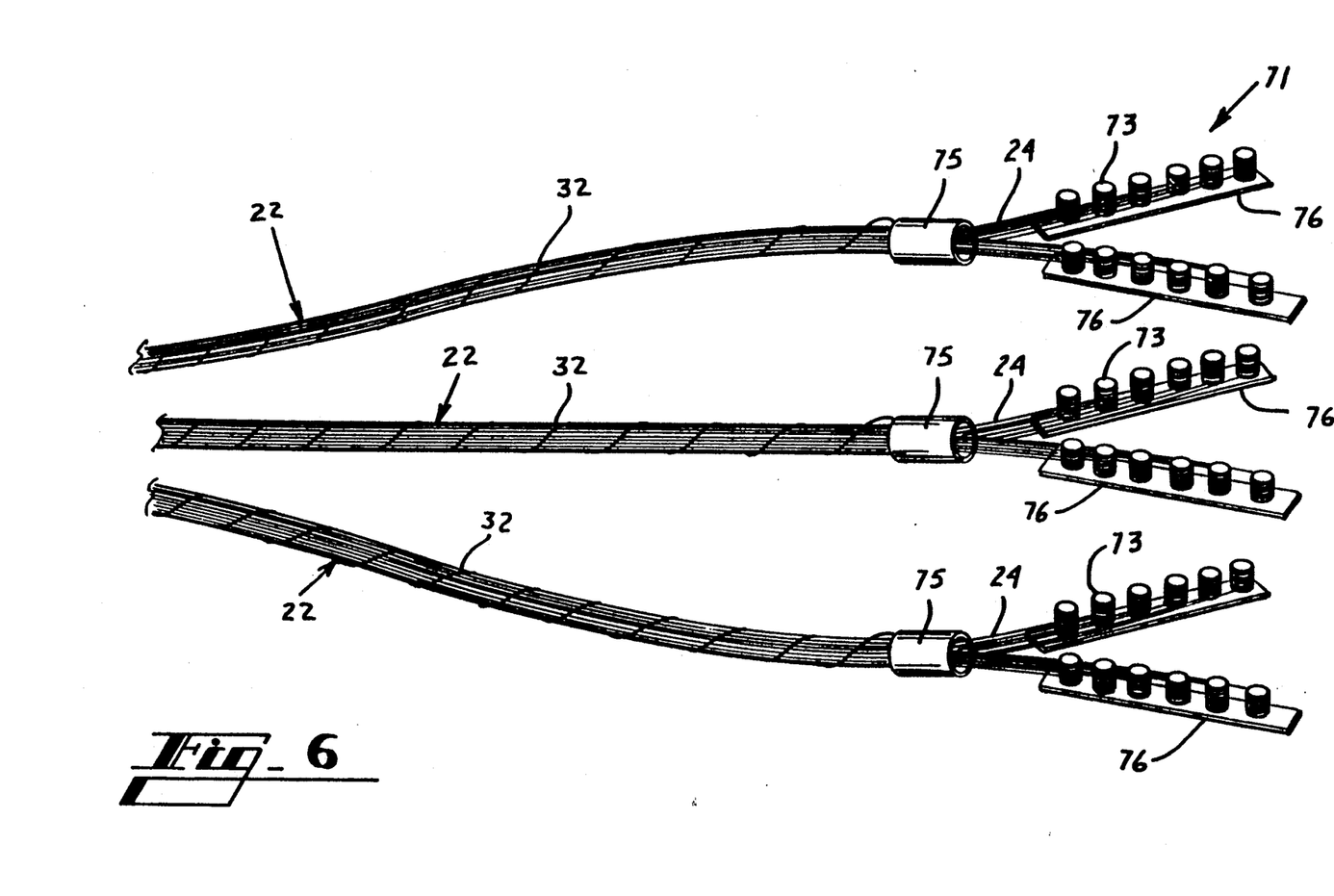
FIG. 6 is a perspective view of a portion of the line of FIG. 5 to show optical fiber supplies and the assembly of pluralities of optical fibers into separate units.

Then the optical fibers 24—24 which may be assembled into at least one unit are moved into gradual juxtaposition with one another and through a device 75 which is effective to apply a binder 32 to the unit being assembled therein. As mentioned hereinbefore, the optical fibers 24—24 are assembled together without an

TABLE III

| | Compositions (parts b.w.) | | | | | | | | | | | | |
|---|---|---|---|---|---|---|---|---|---|---|---|---|
| | Examples | | | | | | | | | | | | |
| Constituents | A | B | C | D | E | F | G | H | I | J | K | L | M |
| Oil (Drakeol 35) | 93 | 97.5 | 92.5 | 92 | 92 | 95.5 | | | 92 | 92 | 88 | 83 | 91.5 |
| Oil (L-100) | | | | | | | 93 | 92 | | | | | |
| Colloidal Filler (N70-TS) | 7.0 | | 6.0 | 6.5 | 6.0 | | 7.0 | 6.0 | 6.0 | 6.0 | 7.0 | 7.0 | 7.0 |
| Colloidal Filler (M5) | | 2.5 | | | | 2.5 | | | | | | | |
| Bleed Inhibitor (Kraton G1701) | | | 1.5 | 1.5 | 2.0 | 2.0 | | 2.0 | | | | | 1.5 |
| Bleed Inhibitor (Kraton G1657) | | | | | | | | | 2.0 | | | | |
| Bleed Inhibitor (TRW-7-1511) | | | | | | | | | | 2.0 | | | |
| Bleed Inhibitor (LM-MS) | | | | | | | | | | | | 5.0 | 10 |
| Stabilizer (Irganox 1010) | 0.2 | 0.2 | 0.2 | 0.2 | 0.2 | 0.2 | 0.2 | 0.2 | 0.2 | 0.2 | 0.2 | 0.2 | 0.2 |
| (a)$\sigma_c$ (Pa) | 10 | 9.4 | 7.2 | 8.1 | 6.6 | | 3.1 | | | | | 3.6 | 15 |
| (a)$G_e$ (KPa) | 1.8 | .5 | 1.5 | 1.7 | 1.7 | | 1.7 | | | | | 2.0 | 2.6 |
| time (hrs) | 16 | | 16 | 16 | 16 | | 16 | | | | | 16 | 22 |
| (b)$\sigma_c$ (Pa) | 10 | | 13 | 14 | 15 | | 17 | | | | | 6.9 | 27 |
| (b)$G_e$ (KPa) | 1.8 | | 1.8 | 2.0 | 1.8 | | 2.2 | | | | | 1.8 | 3.0 |

Advantageously, the waterblocking material 36 which may be used to fill the core yields at a low enough stress so that the optical fibers 24—24 and units 22—22 are capable of moving within the core when the cable is loaded or bent. The yielding filling material allows the optical fibers to move within the tube 34 which reduces the stress therein and lengthens the life of the optical fibers.

As mentioned hereinbefore, the cable of this invention may include units not being stranded together, or stranded or with an oscillating lay. Of course, the non-stranded is preferred inasmuch as the stranding apparatus may be eliminated and line speeds increased.

The tube 34 may be considered as one element of a sheath system 42 of the cable 20. Returning now to FIGS. 1 and 2, it is seen that over the tube 34 are disposed other elements of a sheath system comprising a bedding layer 43 and a group of reinforcing strength members 48—48, an intermediate jacket 50 of polyethylene, another bedding layer 52 and another group of strength members 56—56 and an outer jacket 58. Both intentional stranding lay. In other words, the optical fibers are not stranded together and any lay generally is infinite. Of course, as the optical fibers 24—24 are assembled together, there may be some crossover of the optical fibers to produce a modicum of unintended stranding, but in which the relative positions of the optical fibers will not change more than 360°.

After the optical fibers 24—24 have been assembled into units, they are advanced through a guide tube (not shown) and a chamber, which resembles a core tube and die cavity in a conventional crosshead extruder, in which the hereinbefore described waterblocking material 36 is introduced in and about the core. This causes the interstices among the optical fibers 24—24 of each unit 22 of the core as well as the portion of the cable cross-section between the units 22—22 to be filled with the waterblocking material 36. From the filling chamber, the filled core is advanced through a core tube of an extruder 86 which is operative to extrude the plastic tube 34 about the units. This tube is common to all the units 22—22.

As mentioned hereinbefore, it should be understood that the cable also could be what is referred to as an air core cable which does not include a filling material. In that cross-section, the units 22—22, prior to their movement through the extruder 86, are moved past a device 81 which supplies a tape 82 made of a plastic material such as TEFLON ® plastic. The tape is wrapped by well known methods about the core to form a core wrap which functions as a thermal barrier to protect the units during extrusion of the tube 34.

As the enclosed core 21 is advanced through the extruder 86, a plastic material is caused to be extruded about the enclosed core to form the inner jacket 34 which is the common tube. From the extruder 86, the jacketed core is passed through a cooling trough 88 which is exposed to a negative pressure. This causes the tube 34 to expand away from the core 21 and be sized externally as it cools. As a result, the tube 34 is formed about the core 21 with a packing density which permits relative movement between the core and the tube and the subsequently applied portions of the sheath system.

Afterwards, the cooled and jacketed core is moved through a device 91 which applies the bedding layer 43 about the jacket. Then the jacketed core is advanced through a payout assembly 95 for the longitudinal strength members 48—48. The payout assembly 95 is disclosed in U.S. Pat. No. 4,446,686 which issued on May 8, 1984 in the names of A. J. Panuska, M. R. Santana and R. B. Sprow and which is incorporated by reference hereinto.

Mounted within the device 95 are a plurality of spools of lengths of wires which form the strength members 48—48. A controlled amount of back tension is applied to the spools. The payout assembly 95 is effective to wrap the wires in spaced relation to each other helically about the bedding layer 43.

The inner cable structure is moved through the payout assembly 95 and then through the core tube of an extruder 101 which applies the intermediate jacket 50. At the same time, the strength members 48—48 are fed from the supply spools and caused to be directed to travel in substantially longitudinal paths adjacent to the inner cable structure. The strength members become disposed in the predetermined helical lay prior to their entry into the extruder.

Following extrusion of the intermediate jacket 50 about the inner cable structure and its cooling in a trough 103, the second bedding layer 52 is applied by a device 105. Then the partially completed cable structure is advanced through a second strength member payout assembly 107 and an extruder 108 which are similar to the payout assembly 95 and the extruder 101. These are effective to cause the strength members 56—56 to be wrapped helically about the intermediate jacket and the outer jacket 58 to be extruded thereover. Afterwards, the jacketed core is advanced through a cooling trough 109.

Advantageously, cable 20 is a torque-balanced cable. The two layers of strength members are wrapped helically in opposite directions so that under a tensile load the two layers produce equal but oppositely directed torques about the longitudinal axis of the cable. This eliminates twisting that can otherwise occur when the cable 20 is exposed to sustained tensile loads.

After the extrusion of the outer jacket 58, but before the cable 20 is taken up, the core 21 is caused to be coupled to the sheath system 42 after the sheath has been elongated by a predetermined amount. Coupling as applied to the manufacture of the cable 20 connotes that the relative movement between the core 21 and the sheath system 42 is substantially zero. This is accomplished in accordance with the methods and apparatus disclosed in U.S. Pat. No. 4,446,686 which has been incorporated by reference hereinto.

An apparatus 110 (see FIG. 5) is effective to elongate the sheath system 42 by the application of tensile forces to allow the core 21 to move relative to the sheath system. After the sheath system 42 has been extended relative to the core 21, the core is coupled to the sheath system to prevent relative movement between the core and the sheath system. The coupling is temporary inasmuch as the core 21 is subsequently decoupled from the sheath system 42 so that relative movement can occur therebetween. The sheath system 42 recovers elastically in the absence of tension because of its composite structure which includes the strength members having a relatively high modulus of elasticity. The sheath extension and the coupling are accomplished so that when the stretched sheath system 42 recovers, the resultant ratio of the lengths of the core 21 and the sheath system 42 is a predetermined value. The recovery of the sheath system occurs to a substantial degree as the cable 20 is taken up, and by the time the cable is run out and installed in the field, the core-to-sheath length ratio is as desired.

The coupling apparatus 110 includes a linear capstan 112 and a coupling sheave 115 (see FIGS. 5 and 7) which cooperate to produce the coupling after the sheath has been stretched and while it is under tension. Cooperating with the linear capstan 112 to effect the sheath elongation and coupling is the sheave 115. The sheave 115 is mounted rotatably between the side supports of a stand 117 and is power driven by a motor. From the sheave 115, the cable 20 is advanced to a takeup reel 120. The linear capstan 112 is a constant speed apparatus, but the rotational velocity of the coupling sheave 115 is variable. Through a feedback control system, the sheave velocity is controlled to obtain a desired tension in the sheath system 42.

The sheave 115 includes guide means for causing each successive convolution of the cable 20 on the sheave to be moved transversely across a surface 122 of a hub 124 of the sheave. A fin 126 (see FIG. 7) is mounted in a frame 128 and is adjacent to the hub 124. As the sheave 115 is turned rotatably, the fin 126 causes the convolutions of the cable 20 to be separated and each successive one to be moved toward one of flanges 124—129 of the sheave. The movement of the convolutions across the hub 124 from a point to an exit point is helped by tapering the hub 122 (see FIG. 7) so that its largest diameter is adjacent to the entry point of each convolution and smallest at the exit.

Figure 7:
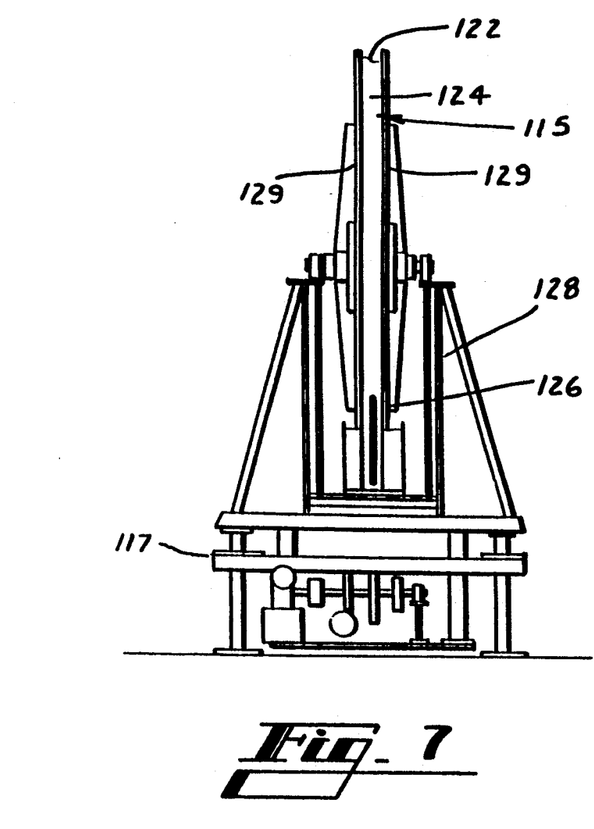
FIG. 7 is an end view of a portion of the apparatus of FIG. 5 to show a facility which is effective to adjust the core-to-sheath length ratio of the cable of FIG. 1.

The core 21 is coupled to the sheath system 42 after the sheath system has been elongated between the linear capstan 112 and the large sheave 115. The amount of the strain in the sheath system 42 between the linear capstan 112 and the sheave 115 is equal to the total strain of the core 21. That total strain is the sum of geometric strain, a strain caused by fiber payout tension, and, if desired, an increment which insures that the length of the core 21 in the final product exceeds the length of the sheath system 42 in order to obtain a core-to-sheath length ratio preferably between 1.0000 and about 1.0015. The tension in the sheath system 42 can be controlled by controlling the rotational velocity of the sheave 115 to compensate for the geometric strain, which comes about because the fiber center is displaced from the center or neutral axis of the sheath, as well as the other strains. The required tension will vary inasmuch as the geometric strain varies as a function of the number of units 22—22 in the core 21.

The cable 20 is wound, with its sheath system 42 in a stretched condition, on the sheave 115 for a number of turns sufficient to achieve a coupling of the sheath system 42 and the core 21 while the sheath is in the stretched condition. It has been found that three turns are sufficient and that five are more than adequate. In the apparatus 70, there is a back tension on the core 21. The coupling between the core 21 and the sheath system 42 is sufficient so that the back tension on the core cannot cause the core to slip relative to the sheath to which it is coupled. A relatively small force is required on the output side of the coupling arrangement to balance the back tension on the other side. This small tension on the output side is provided in a relatively small length of the cable between the sheave 115 and the takeup reel 120 by the weight and friction of the fiber core 21.

Important to the successful coupling of the core 21 to the sheath system 42 is the requirement that the diameter of each of the convolutions of the cable 20 on the coupling sheave 115 be larger than the diameter of any other convolution in which the cable is subsequently wound. It has been found that successively increasing convolution diameters results in the application of increased tensile forces to the core 21. The increased tensile forces applied to the core 21 in such an arrangement causes the core to be held against the sheave side of the tube 34 thereby increasing the geometric strain. The movement of the cable 20 past sheaves which increase in diameter between at least two successive sheaves also results in an increasing shortfall of the core. This condition is referred to as pumping and is cumulative. The coupling sheave 115 has a diameter larger than all succeeding sheaves and larger than any subsequent convolution in which the cable 20 is wound, whether it is coupled or decoupled.

It also is important that the diameter of the coupling sheave 115 be relatively large. As will be recalled, the core 21 tends toward the inner side of the surrounding tube 34 as the cable 20 is moved about a sheave. The desired location is along the neutral axis of the cable 21. The larger the sheave, the more each increment of the cable 20 approaches a straight line. For an infinitely large diameter sheave, the core of each increment approaches a length equal to an increment along the neutral axis. Also, a relatively large diameter sheave 115 is used because the smaller the sheave diameter, the greater the force required to compensate for the shortfall of the core 21. Shortfall is independent of the sheave diameter; however, when the shortfall is expressed as a percent of the sheave circumference to arrive at the geometric strain, the percent becomes dependent on the diameter of the sheave. Therefore, for a smaller diameter sheave, the elongation of the sheath system 42 must be greater than that for a larger sheave. As a result of the geometric strain increasing as the diameter of the sheave 115 decreases, the tensile force required to elongate the sheath 42 to compensate for the geometric strain increases. The use of a coupling sheave which in a preferred embodiment has a diameter of about nine feet overcomes these problems.

The coupling is temporary. When the cable 20 is substantially free of tension, the core 21 and the sheath system 42 are decoupled because of the elastic recovery of the composite sheath system to its original length, and the lengths of the two are substantially equal. In the preferred embodiment, the cable 20 is decoupled as it is advanced off the sheave 115 and moved to the takeup reel 120. The tension in the cable core 21 between the coupling sheave 115 and the takeup reel 120 is essentially zero. The sheath system 42 on the takeup reel typically is under a relatively small tension which is sufficient to provide a takeup package that is suitable for shipping and/or subsequent handling. By the time the cable 20 has been wound on the takeup reel 120, sufficient core 21 has been carried forward with the sheath system 42 on the output side of the sheave 115 to cause the ratio of core and sheath lengths to be a predetermined value, and the core and the sheath system are substantially decoupled.

What is generally sought is a zero difference in length between the cable sheath system 42 and the core 21 when the cable 20 is installed in the field. Removing substantially all the tensile forces causes the sheath system 42 to recover by an amount equal to the sum of the core geometric and payout strains to cause the core and sheath lengths to be substantially equal. However, as will be recalled, in the preferred embodiment, the sheath system 42 is elongated by an amount equal to the total core strain which includes a predetermined increment in addition to the geometric strain. As a result, when the sheath system 42 recovers elastically, the core length exceeds the sheath length slightly and the core is under a slight compressive load.

The cable of this invention is a solution to problems encountered with prior art cables. Because it has a common tube which encloses the optical fiber, it is relatively compact. Because the fibers are not stranded, the manufacturing process is less expensive than for other cables. Also, there is substantially no added loss as a result of assembling the optical fibers into a cable. It has been found that waterblocking materials of the cable of this invention with $\sigma_c \leq 70$ Pa resulted in a cable having a mean added loss which is less than about 0.1 dB/km. Further, the cable possesses excellent mechanical characteristics. Inasmuch as there is no internal strength member, the possibility of the strength member damaging the fibers has been eliminated.

Figure 8:
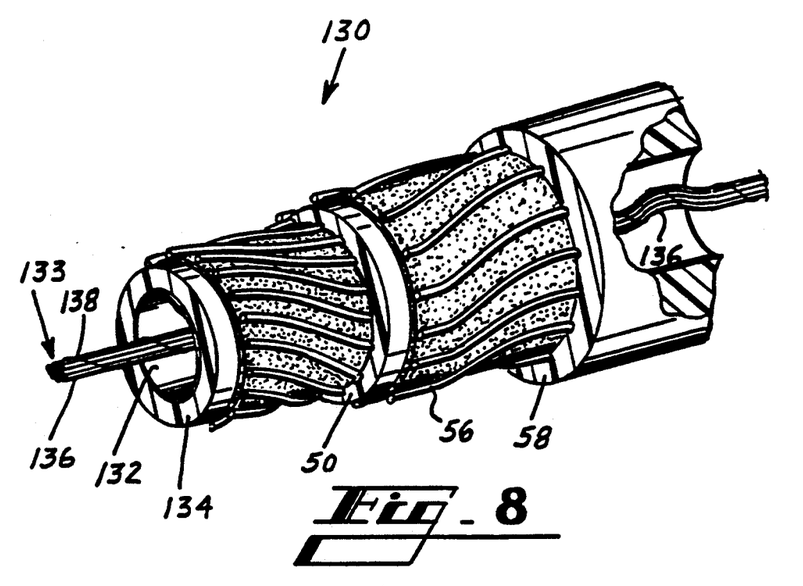
FIG. 8 is a perspective view of a cable which includes one unit.

As mentioned hereinbefore, the cable is not restricted to one that is filled. For an air core cable 130 (see FIG. 8), a plastic core wrap material 132 is introduced between a core 133 and a plastic tube 134. The cable 130 includes a plurality of optical fibers 24—24. The optical fibers 24—24 of the cable 130 have a generally infinite lay length, or, in other words are not intentionally stranded together. Portions thereof may, however, become disposed in an undulated configuration. The remaining portions of the cable 130 are designated with the same numerals as that in FIG. 1.

Figure 9:
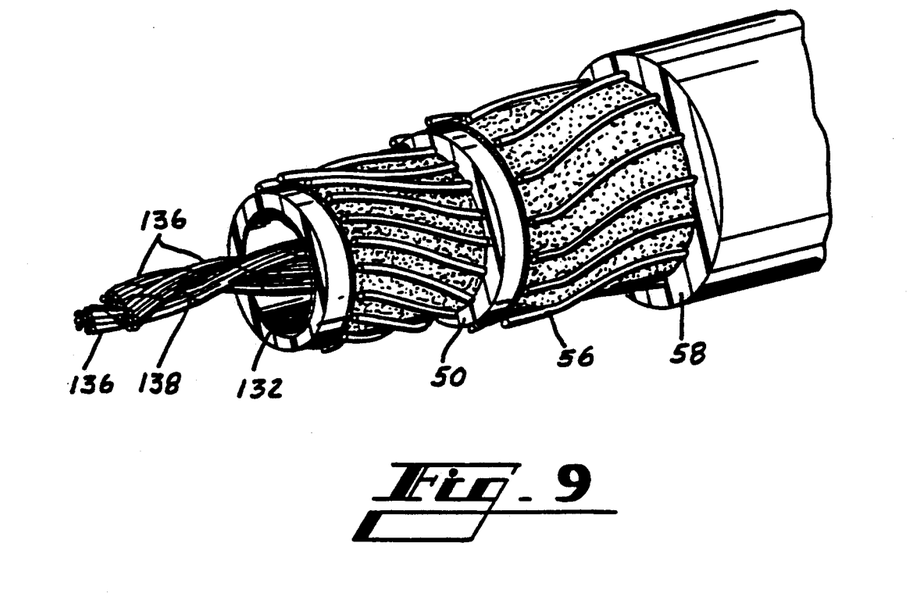
FIG. 9 is a perspective view of still another cable.

Although the optical fibers 24—24 are not stranded together, the units 136—136 may have an oscillating lay or be stranded together (see FIG. 9). In that arrangement, the units are secured together with a binder.

CABLE EXAMPLE 1

In a cable, two units each of which included twelve single mode, depressed cladding optical fibers having an outer diameter over the coating of 0.0096 inch were assembled. Neither the units nor the optical fibers were stranded. A plastic material comprising a composition based on a polyvinyl chloride (PVC)-ethylene vinyl acetate (EVA) graft polymer was extruded about the units to form a tube having an inner diameter of 0.170 inch while a waterblocking material of example A in Table III was introduced into the core area. The sheath system was of the steel reinforced cross-ply type shown in FIG. 1 and had an outer diameter of 0.41 inch. The mean added microbending loss of this cable at 1310 nm and 1550 nm was 0 dB/km. The final cable losses at 1310 nm and 1550 nm were 0.38 dB/Km and 0.24 dB/km, respectively.

CABLE EXAMPLE 2

Another cable having the same structure as that in Example 1 was provided with an oversheath comprising a copper shield, a stainless steel laminate and another polyethylene jacket. The oversheath provides protection against rodents and lightning. Again, the added loss both at 1310 nm and 1550 nm was 0 dB/km. The final cable loss was determined to be 0.38 dB/Km at 1310 nm and 0.22 dB/km at 1550 nm.

It is to be understood that the above-described arrangements are simply illustrative of the invention. Other arrangements may be devised by those skilled in the art which will embody the principles of the invention and fall within the spirit and scope thereof.

What is claimed is:

1. An optical fiber cable which includes a longitudinal centerline axis, said optical fiber cable comprising:
    a core which has a longitudinal centerline axis which extends colinearly with a longitudinal centerline axis of the cable, said core comprising:
        a tubular member which is made of a plastic material and which extends colinearly with and is substantially parallel to the longitudinal centerline axis of the cable; and
        a plurality of optical fibers which are disposed within said tubular member without intended stranding and which extend in a direction substantially parallel to the longitudinal centerline axis of the cable, each of said optical fibers including an optical glass transmission medium and at least one coating layer which encloses said optical glass transmission medium;
        the ratio of the cross-sectional area of the plurality of optical fibers to the cross-sectional area within said tubular member intentionally not exceeding a predetermined value;
        said optical fibers being able to become repositioned within said tubular member as said cable is handled to prevent undesirable added losses and each of said optical fibers having a length which exceeds the length of said tubular member;
    a strength member; and
    a jacket which is made of a plastic material and which encloses said core.

2. The cable of claim 1, wherein the ratio of the cross-sectional area of the plurality of coated optical fibers to the cross-sectional area within the tubular member does not exceed a value of about 0.5.

3. An optical fiber cable which includes a longitudinal centerline axis, said optical fiber cable comprising:
    a core which has a longitudinal centerline axis which extends colinearly with a longitudinal centerline axis of the cable, said core comprising:
        a tubular member which is made of a plastic material and which extends colinearly with and is substantially parallel to the longitudinal centerline axis of the cable; and
        a plurality of optical fibers which are disposed within said tubular member without intended stranding and which extend in a direction substantially parallel to the longitudinal centerline axis of the cable, each of said optical fibers including an optical glass transmission medium and at least one coating layer which encloses said optical glass transmission medium with the ratio of the cross-sectional area of the plurality of optical fibers to the cross-sectional area within said tubular member intentionally not exceeding a predetermined value;
        said optical fibers being able to become repositioned within said tubular member as said cable is handled to prevent undesirable added losses and each of said optical fibers having a length which exceeds the length of said tubular member;
    a waterblocking material which is disposed within said tubular member and which fills substantially the interstices between the optical fibers and between the optical fibers and the tubular member, the waterblocking material having a critical yield stress and a shear modulus which allows movement of the optical fibers within the tubular member when the waterblocking material is subjected to a predetermined stress;
    a strength member; and
    a jacket which is made of a plastic material and which encloses said core.

* * * * *